(12) United States Patent
Sandvik et al.

(10) Patent No.: US 9,975,607 B2
(45) Date of Patent: May 22, 2018

(54) DEFLECTOR GRIP ADAPTER, DEFECTOR AND SYSTEM FOR LAUNCHING AND HAULING OF SUCH A DEFLECTOR

(71) Applicant: ULMATEC BARO AS, Fosnavåg (NO)

(72) Inventors: Karl Fredrik Sandvik, Hareid (NO); Finn Hjeldnes, Eidsnes (NO)

(73) Assignee: ULMATEC BARO AS, Fosnavåg (NO)

( * ) Notice: Subject to any disclaimer, the term of this patent is extended or adjusted under 35 U.S.C. 154(b) by 0 days. days.

(21) Appl. No.: 14/891,225

(22) PCT Filed: Sep. 19, 2013

(86) PCT No.: PCT/NO2013/000045
§ 371 (c)(1),
(2) Date: Nov. 13, 2015

(87) PCT Pub. No.: WO2015/041536
PCT Pub. Date: Mar. 26, 2015

(65) Prior Publication Data
US 2016/0121973 A1    May 5, 2016

(51) Int. Cl.
*B63B 21/66* (2006.01)
*G01V 1/20* (2006.01)
*G01V 1/38* (2006.01)

(52) U.S. Cl.
CPC .............. *B63B 21/66* (2013.01); *G01V 1/202* (2013.01); *G01V 1/3808* (2013.01); *B63B 2021/666* (2013.01); *G01V 1/3826* (2013.01)

(58) Field of Classification Search
CPC . B63B 21/66; B63B 21/663; B63B 2021/666; G01V 1/3843; G01V 1/3852
See application file for complete search history.

(56) References Cited

U.S. PATENT DOCUMENTS

| 4,553,124 A * | 11/1985 | Malicki | ................. F16B 31/025 338/2 |
| 2012/0125249 A1* | 5/2012 | Oxseth | .................... B63B 21/66 114/253 |

FOREIGN PATENT DOCUMENTS

EP    2420866 A1    2/2012

* cited by examiner

*Primary Examiner* — Andrew Polay
(74) *Attorney, Agent, or Firm* — Birch, Stewart, Kolasch & Birch, LLP

(57) ABSTRACT

A marine deflector handling system includes a seismic survey vessel with a deflector towing sheave with a towing line to a seismic deflector bridle block. The bridle block includes, as counted from its outer end to its inner end: two triple head arms with each its triple head in their outer ends for fore and aft sets of bridle lines to a deflector, wherein said triple head arms in their inner ends are coupled together in a hinge bearing block which further holds an outer end of a grip adapter stem, wherein said grip adapter stem in its opposite, inner end is provided with a grip adapter axle block with a transverse through extending and protruding grip adapter axle arranged for being gripped by a crane jaw, wherein said grip adapter axle further holds an outer end of a sheave block stem with an inner end provided with a sheave block for said towing line.

14 Claims, 12 Drawing Sheets

Figure 1:
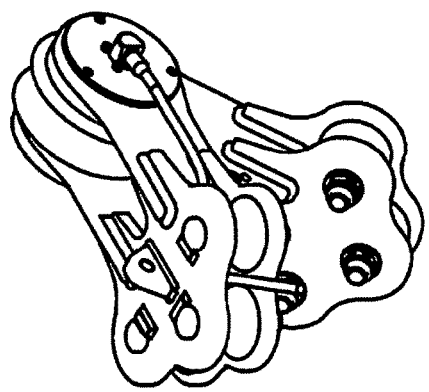
Figure 1:
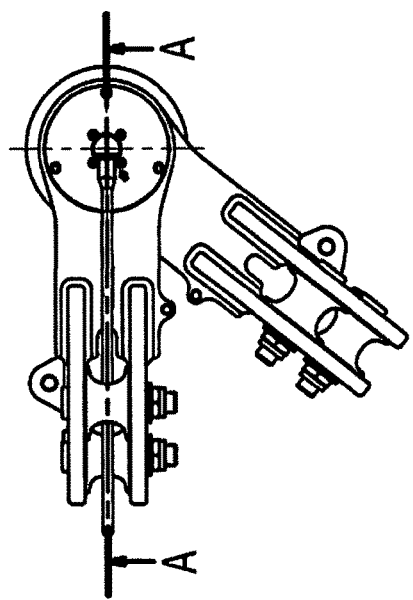
Figure 1:
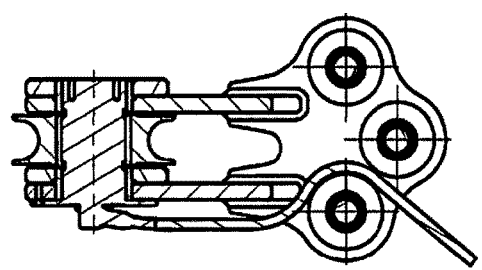

DEFLECTOR GRIP ADAPTER, DEFECTOR AND SYSTEM FOR LAUNCHING AND HAULING OF SUCH A DEFLECTOR

INTRODUCTION

The present invention is a deflector grip adapter for simplifying and improving the handling of launching and hauling of a seismic deflector or another deflector. More specifically, the invention comprises an adapter inserted between a bridle block and a towing line and is arranged for cooperating with a gripper on a deck crane. The invention comprises also a system of deflector, bridle block, adapter and gripper on a deck crane, and a method for hauling or launching a deflector by means of the system.

BACKGROUND ART

In marine seismic geophysical data acquisition is employed one, two or more parallel streamer cables, i.e. hydrophone cables which are towed as a streamer cable array after a vessel. If there are two or more parallel streamer cables being towed as a streamer cable array behind a vessel it is common to use starboard and port deflector paravanes which span out the fore end of the streamer cable array so as for the streamer cables to run parallel and with a desired spanned mutual separation. The streamer cables are 2-10 km of length and their mutual separation may be 25 to 150 m.

Starboard deflector comprises a longitudinally running float of about 10 m length, the length of floats varies depending on the requirements, and down from the float extend vertical deflector wings having an aircraft wing profile and are arranged so as for pulling outward relative the vessel's course line. The deflector wings are held fixed by an upper horizontal plate which resides just below the float, and a lower horizontal plate, and there is likely arranged a horizontal plate in a middle level, too. Bridle lines from the fore and aft portions of the horizontal plates are joined in a bridle block. A bridle block, please see FIG. 1, usually comprise bearing sleeves for the eyelets of the bridle lines on two triple heads on a pair of arms extending from a hinge bearing block with a hinge pin which forms an apex for the six bridle lines. The hinge pin, and thereby the bridle block, is further connected directly or indirectly via a sheave to an eyelet of a towing line. There are load cells on the hinge pin for measuring the force between the towing line and the bridle block. This force is important for monitoring during towing the deflector and thus the entire array, and is not necessarily equal to the towing force as measured from the vessel, as the towing line is strongly affected by its running through the seas through which it runs obliquely abaft of the beam extending to starboard and port side. Particularly during a U-turn from one course to an opposite course the force on the deflector running in the outer lane. The load cells are connected via at least one signal cable laid about one of the bridle lines' bearing sleeves and out along one of the bridle lines, please see FIG. 1.

A problem of the background art is the crane handling upon launching and hauling the deflector, and particularly when changing from lifting by the towing line to gripping the deflector, and oppositely. The bridle block is particularly designed for the dynamic loads which are due to towing after the towing line and is not particularly suited for being gripped by means of a crane, and is thus vulnerable. Another problem is that the cable to the load cells, because it runs outside the bridle block, please see FIG. 1, and is vulnerable during such handling as this may easily be torn off or damaged during handling with crane, wires, lifting yokes or ropes. A damage to the bridle block or the cable to the load cells during handling will incur significant delays particularly during launching of the deflector. A damage to the bridle block will immediately be visible; a damage to the load cell may possibly not be discovered before one is about to measure the pulling load after the array has been spanned out.

EP2420866 discloses a connecting device for wide tow seismic survey where the bridles are comprising at least one solid link or connection device for releasable connection to lines under tension and extending in different directions.

BRIEF SUMMARY

The invention is defined in the attached independent patent claims. Dependent, advantageous features are defined in corresponding dependent claims.

FIGURE CAPTIONS

Figure 2:
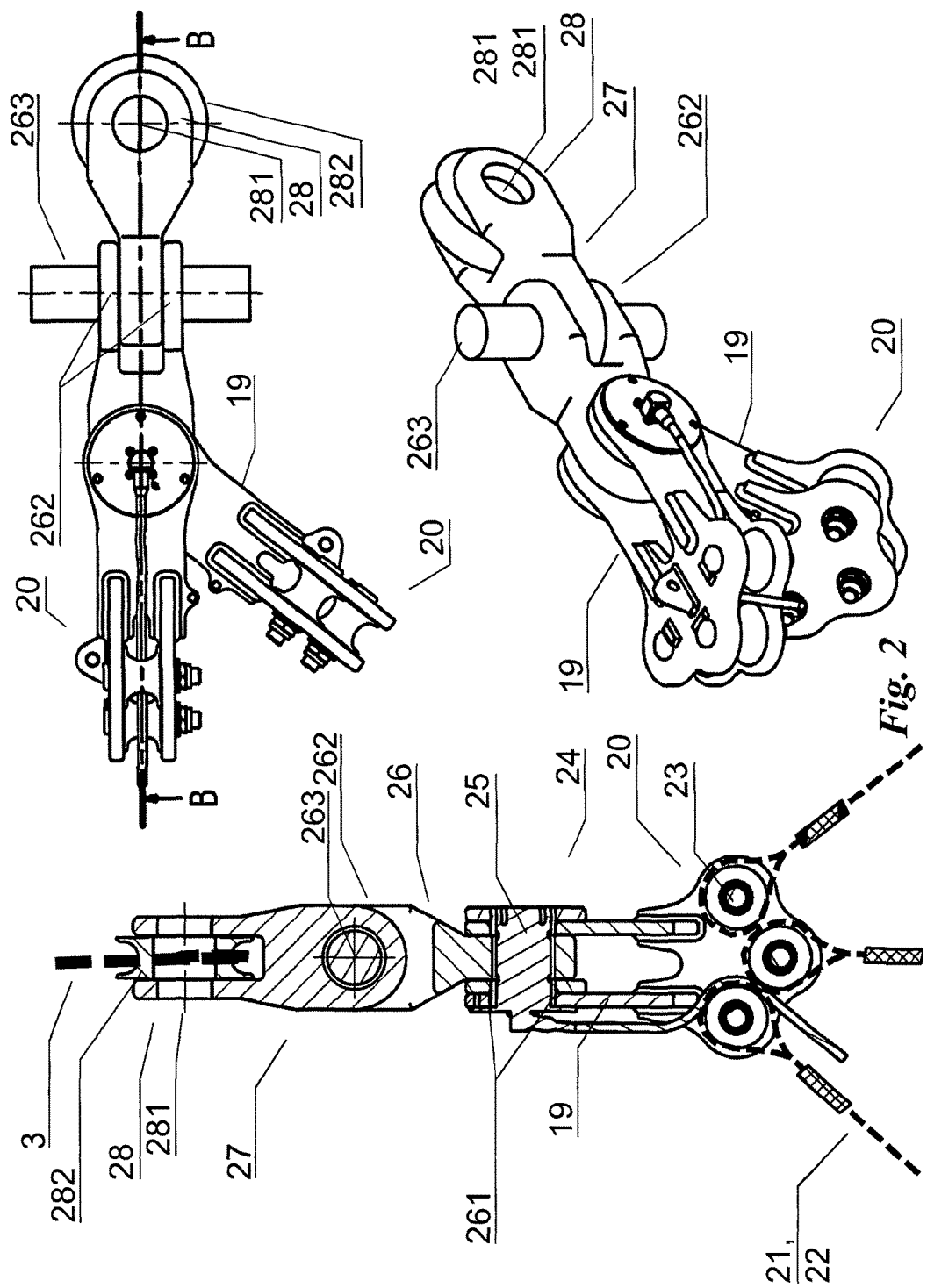

The invention in its different aspects is illustrated in the attached FIGS. 1, 2, . . . , 11.

FIG. 1 illustrates a bridle block according to the background art described above. To the right is seen a perspective view, in the middle a view as seen into the direction of the axis of the hinge bearing block, and to the left a section through the line A-A in the middle. In the lower portion of the drawing to the left is shown three bearing sleeves for the eyelets of the bridle lines on one of the two triple heads on each of its pair of arms extending from a hinge bearing block with a hinge pin which forms an apex for the six bridle lines. The hinge pin, and thus the bridle block, is further attached directly or indirectly via a sheave to an eyelet on a towing line. There are load cells on the hinge pin for measuring the force between the towing line and the bridle block. An electrical conductor which connects the force sensor is illustrated laid via one of the bearing sleeves for one of the bridle lines and which extends along the bridle line to the paravane.

FIG. 2 illustrates a bridle block according to the invention. To the lower right is a perspective view, upper right is a view as seen in along the hinge bearing block axis, and to the left is a section through the bridle block according to the invention taken through the line B-B. There is connected a crane grip adapter stem between the hinge bearing block and a towing line sheave block, wherein between those is arranged a grip adapter axle comprising two oppositely directed protruding axle ends or sleeve ends arranged for being gripped and held by a gripping claw on a crane. One may perceive it as if the sheave for the towing line's eyelet has been moved from the hinge bearing block's pivot pin of the background art to a second axle bolt on a new towing line sheave block. Thus the new bridle block gets a new structure and surprising novel properties.

Figure 3:
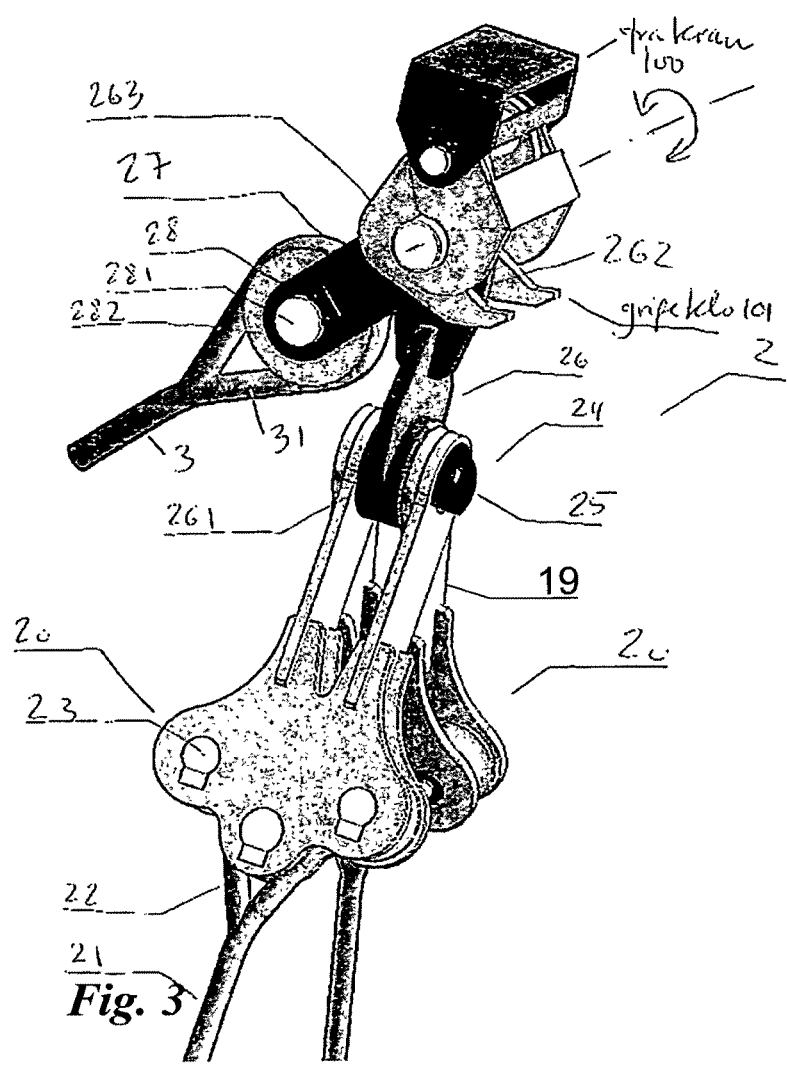

FIG. 3 illustrates a situation wherein a jaw (100) on a crane (100) has caught hold on the two protruding ends of the grip adapter axle (263) according to the invention, and wherein the novel bridle block (2) according to the invention has been folded up about the link about the joint about the grip adapter axle (263) so as for the towing line (3) with the sheave block with the towing line (3) hangs out and down towards one side, and that the triple heads (20) with the bridle lines (21) and the entire deflector (2) hangs down below, such that it all now is suspended by the grip adapter axle (263).

Figure 4:
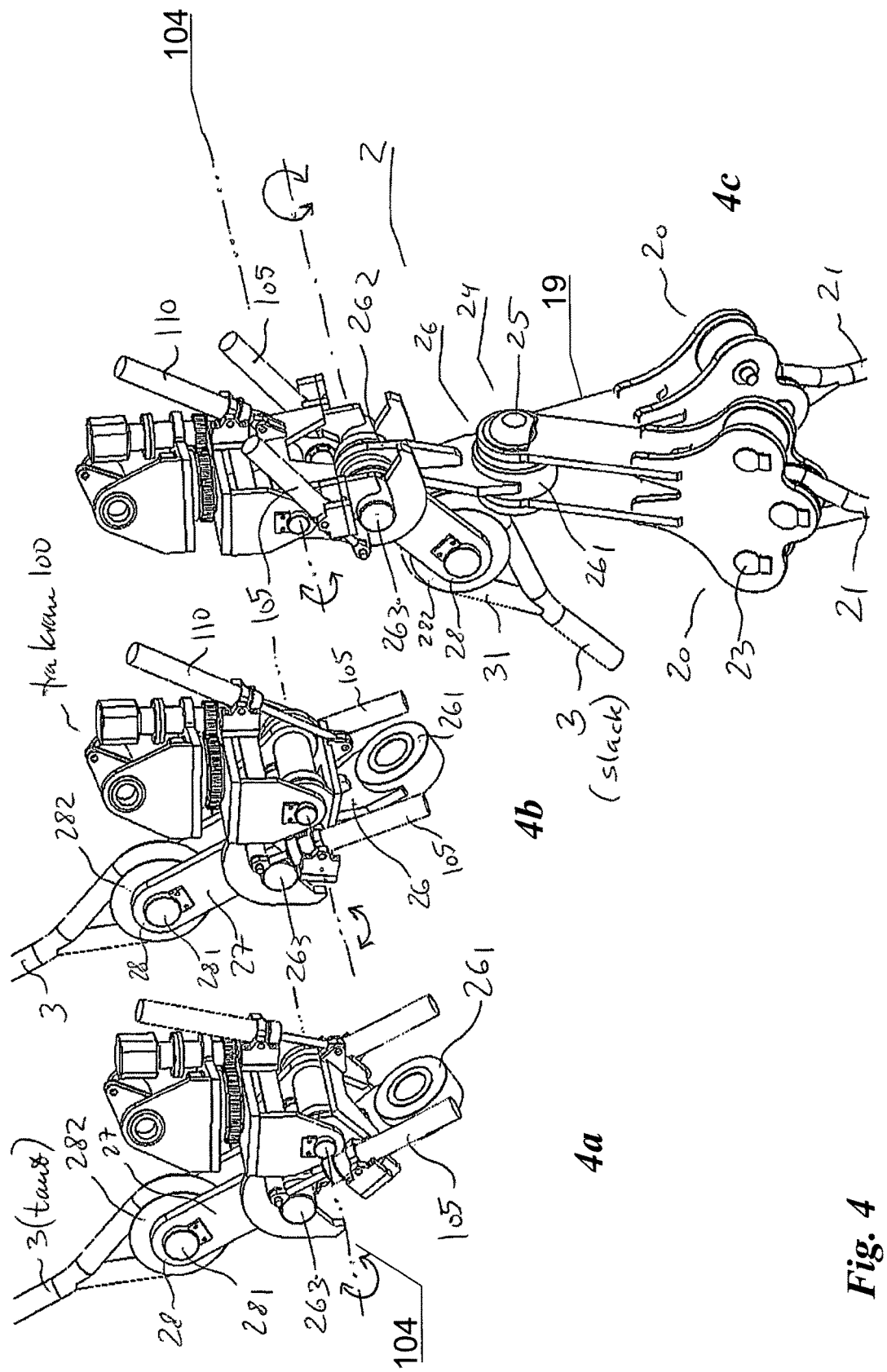

FIG. 4 shows the grip jaw (101) in action. It comprises an upper jaw (102) and a lower jaw (103). The crane guides the double claws of the first upper jaw (102) in over the transverse grip adapter axle (263) so it rest upon this. After that the double claws of the second lower jaw (103) are closed in under and about the opposite face of the cylinder surface of the grip adapter axle (263) and closes this. Thereupon the towing line (3) is slackened, and the entire load is thus transferred to the crane (100) as shown above in FIG. 3. Thus the entire deflector may be lifted by the crane up to the deck. The opposite process is conducted for transferring a deflector from the deck until it may be released from the crane and be taken over by the taut towing line (3).

Figure 5:
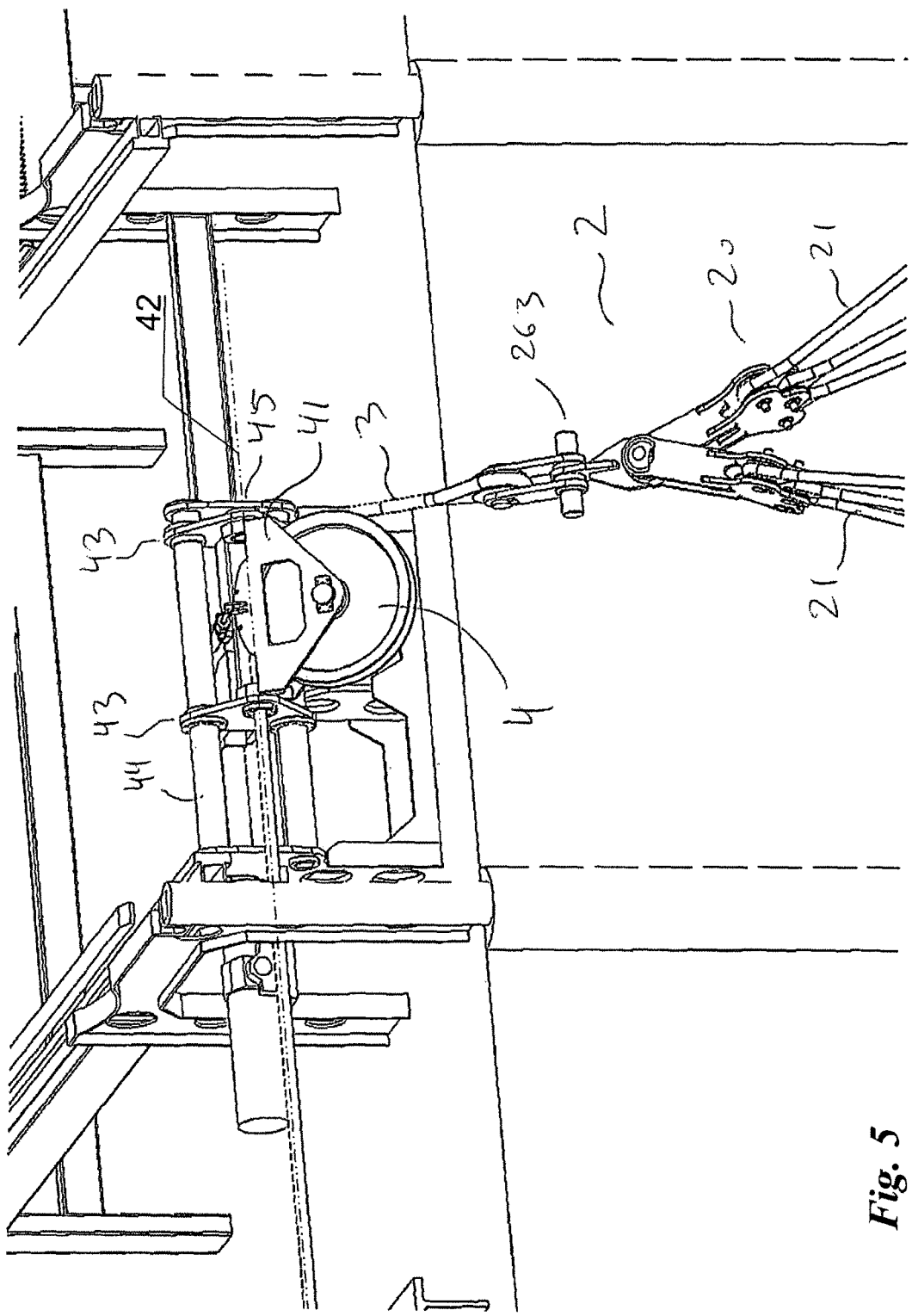

FIG. 5 illustrates the novel bridle block (2) of the invention hanging in the towing line (3) just below the towing sheave (4) near the deck, with the bridle lines (21) to the deflator (2) hanging spanned down along the ship's side. Here forward is to the right, and afterwards on the vessel towards the left. The towing sheave (4) in the towing block is arranged flagging suspended in a tangential horizontal axis so as for the towing line (3) to enter from afore and out about the towing sheave (4), and in an embodiment the towing block is mounted in a horizontally cushioned and dampened rail arrangement some as for force variations in the towing line are cushioned and dampened. In this position for the deflector and will the grip adapter axle (263) lie horizontally and in a longship direction, please see also FIG. 6a, b, and FIGS. 8 and 9. (If it is rotated 90 degrees about the towing line's (3) here nearly vertical axis it will still reside nearly horizontal but transverse orthogonal to the long axis of the ship). In both positions it will be easy for a controlled crane jaw according to the invention go grip the grip adapter axle (263) according to the invention.

Figure 6A:
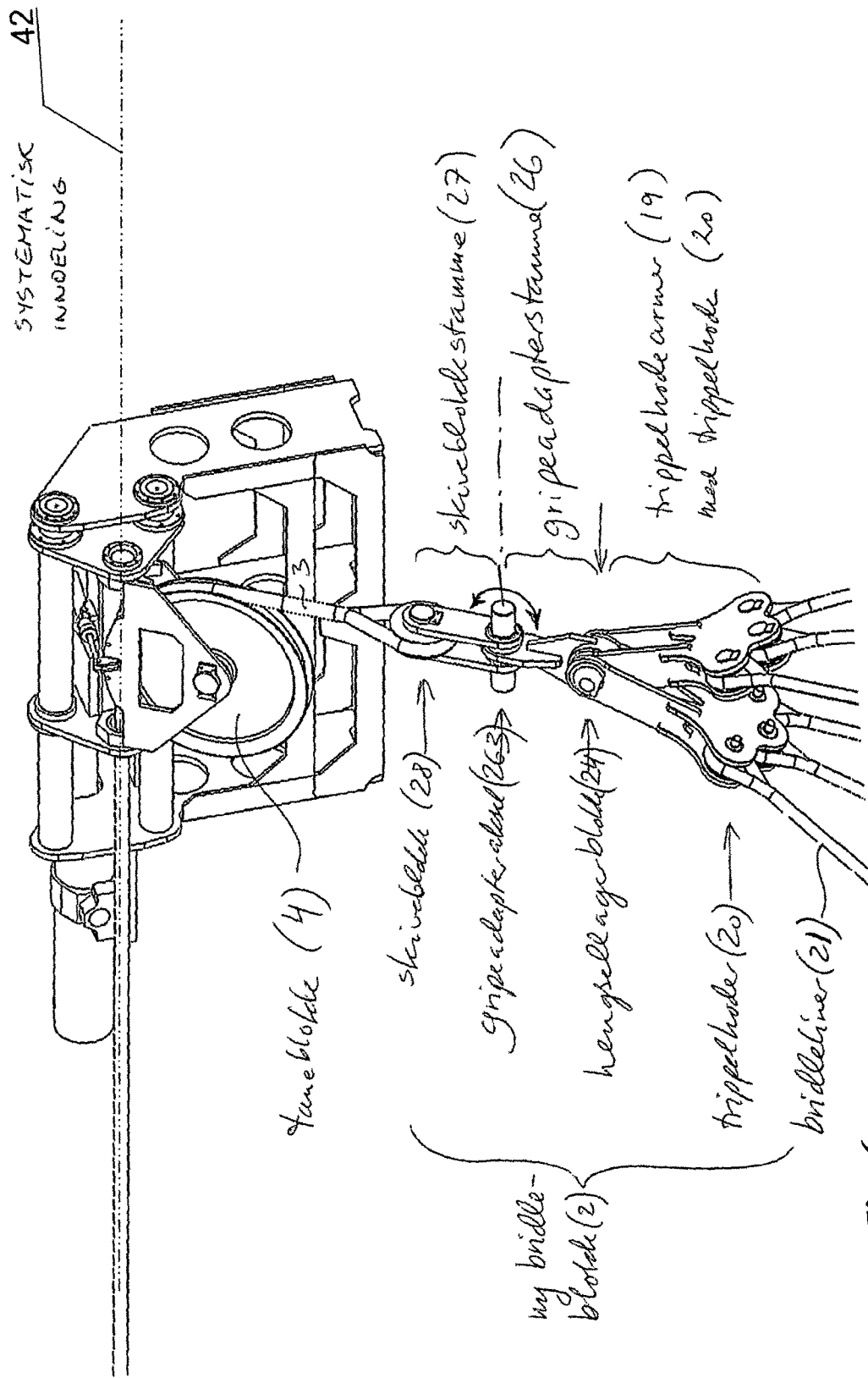

FIG. 6 illustrates a systematic subdivision of the novel bridle block according to the invention, wherein the bridle block hangs in the towing sheave (4) in the towing block by the deck, such as in FIG. 5. The bridle block is subdivided into triple head arms (19) with triple heads (20), a grip adapter stem (26) which is articulatingly connected with a sheave block stem (27) so as those two may be folded up about the grip adapter axle (263). The triple head arms in this preferred embodiment are joined in the hinge bearing block (24) which in the background art also comprises the sheave block for the towing line, too, which vulnerability we now wish to prevent, in addition to the operative advantages of being enabled to grip the grip adapter axle (263) in a quick and safe way. In FIG. 6a it is also indicated, in sequence out from the deflector and inwards: bridle lines (21), triple heads (20) for the bridle lines, the hinge bearing block (24), the grip adapter axle (263), and the sheave block (28) which forms an inner termination of the new bridle block. At the ship's side resides the towing sheave block (41).

Figure 6B:
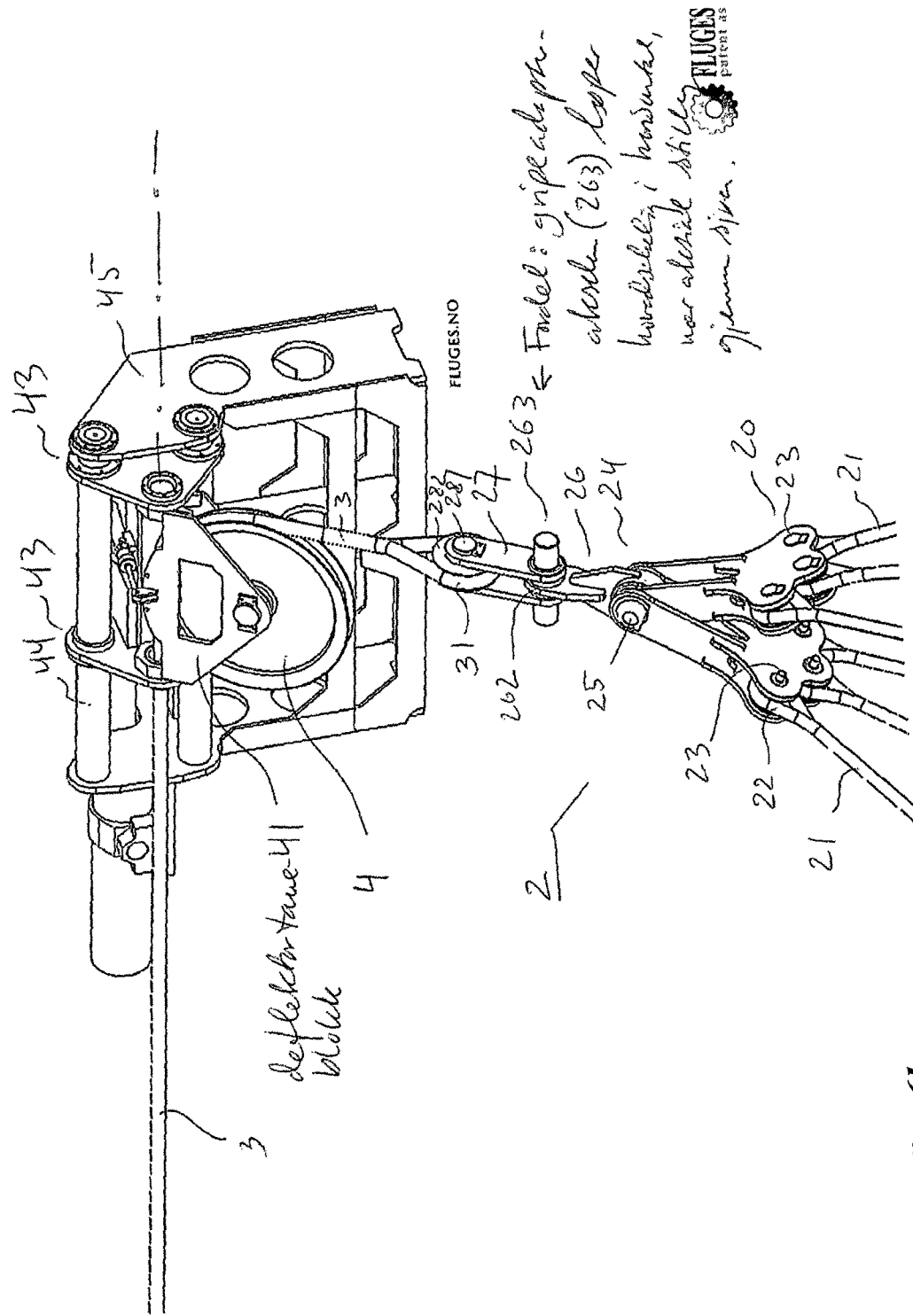

FIG. 6b illustrates the same as FIG. 6a but shows reference numerals of components of the bridle block (2) and of the deflector towing sheave block (41) and its suspension and cushioning mechanism on the deck. An advantage which must be mentioned here is that the grip adapter axle in this position, when the deflector with the bridle block runs through the sea, will run in approximately this horizontally directed and nearly course-directed position so as not to brake in the water. FIG. 6b shows details of a corresponding situation as illustrated by the lower position for the deflector (1) hanging by the ship's side and with the bridle block residing just below the towing sheave block (4) shown in FIG. 8 or FIG. 9.

Figure 7:
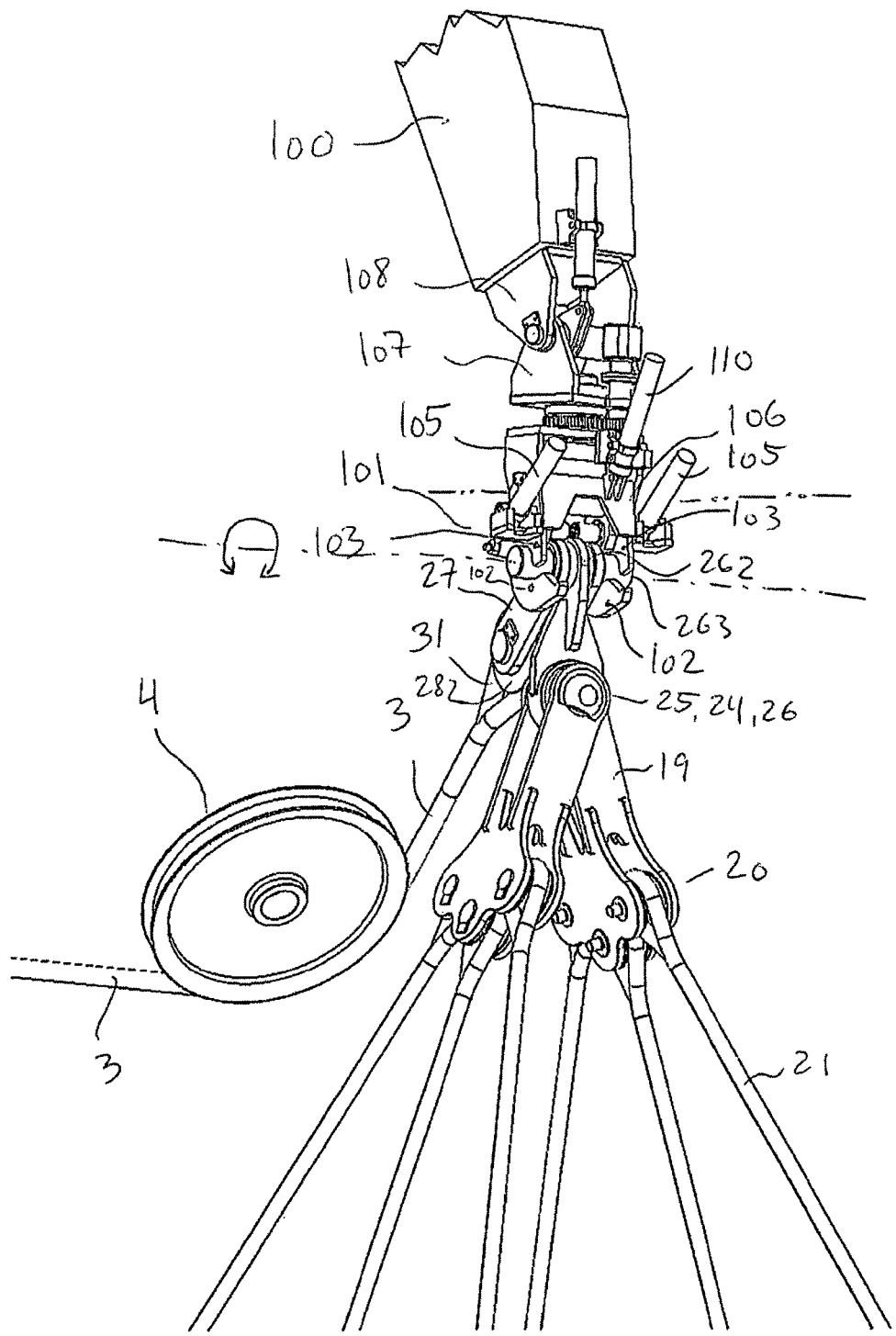

FIG. 7 is an illustration of the new bridle block of the invention suspended from a crane jaw (101) from a crane (100), and wherein the sheave block stem (27) with the towing line (3) has been unloaded by the crane and thus been folded down, and with the towing line extending obliquely downwards towards the towing sheave (4) near the deck. The bridle block is here elevated to just above the deck, outside of the ship's side. This illustration may be valid both for hauling of the deflector from the sea and also for launching the deflector to the sea.

Figure 8:
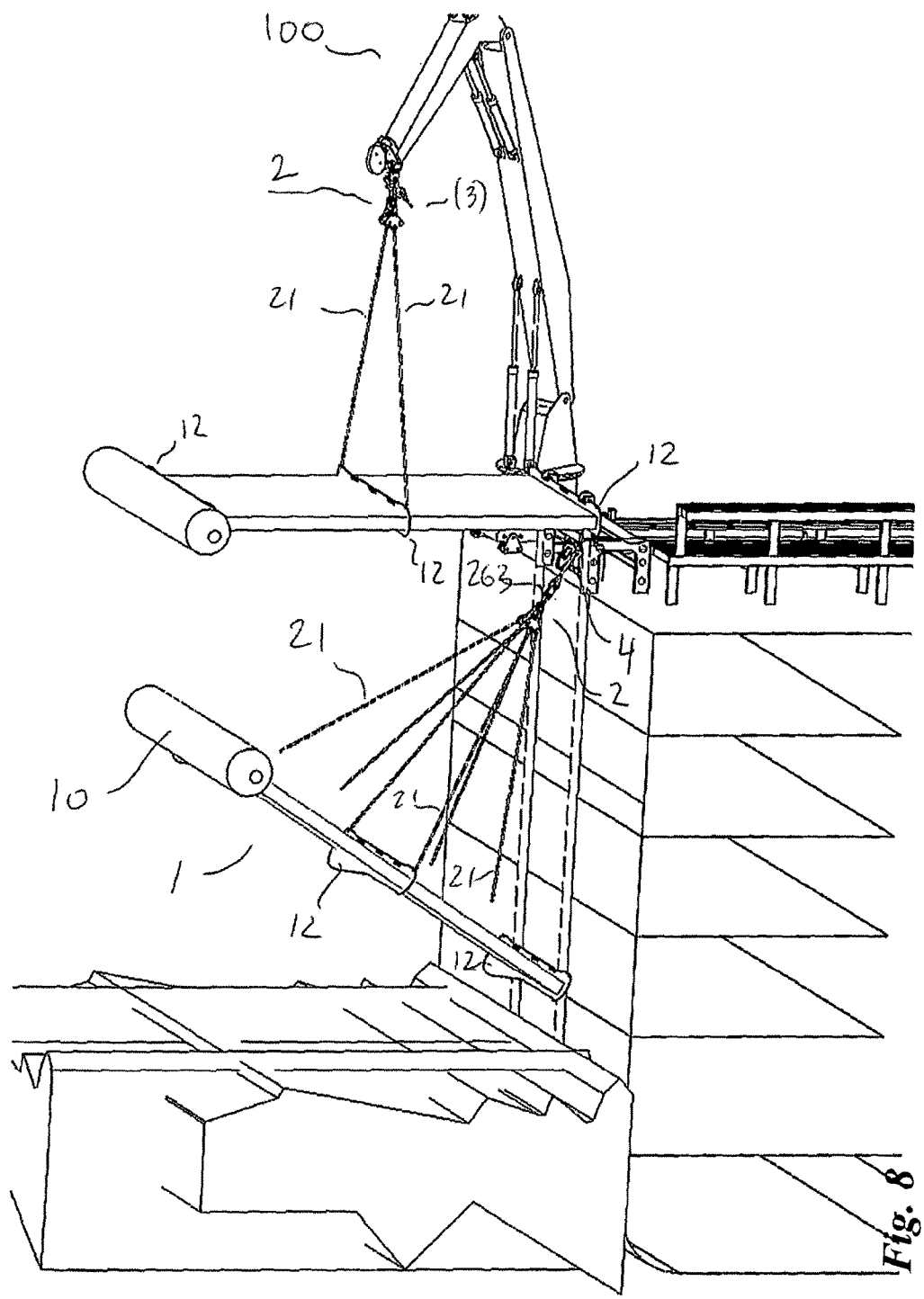

FIG. 8 is an illustration with section across the vessel (and the sea) wherein the section is made just ahead of the towing sheave block (41) station having two vertical rails (56) along the ship's side for hauling and launching a deflector (1) by means of a crane (100). We here look aslant rearwardly relative to the course and into the starboard side of the ship. In the lower position of the shown deflector hangs the bridle block (2) in the towing line (3) just below the towing sheave (4) in the towing sheave (41) by the deck. The lower horizontal plate of the deflector (2) here resides slidingly against the vertical rails along the ship's side. In the upper position of the deflector (1) shown here the crane jaw (101) in the crane (100) has caught hold on the bridle block's (2) grip adapter axle (263) and the towing line (3) here hangs down aslant, quite without load. This illustration may be valid both for hauling and launching of the deflector (1). In the shown upper position of the deflector here the lower horizontal plate of the deflector bears on rest against a grabbing mechanism which may hold it firmly and pull it in over deck in a controlled manner, alternatively feed it out during launching. Please notice that in the drawing the two or more vertical wing profiles which are spanned by the horizontal plates are only shown as one entire plate, not e.g. four distinct wing profiles. The wing profiles design are not the subject of this patent application.

Figure 9:
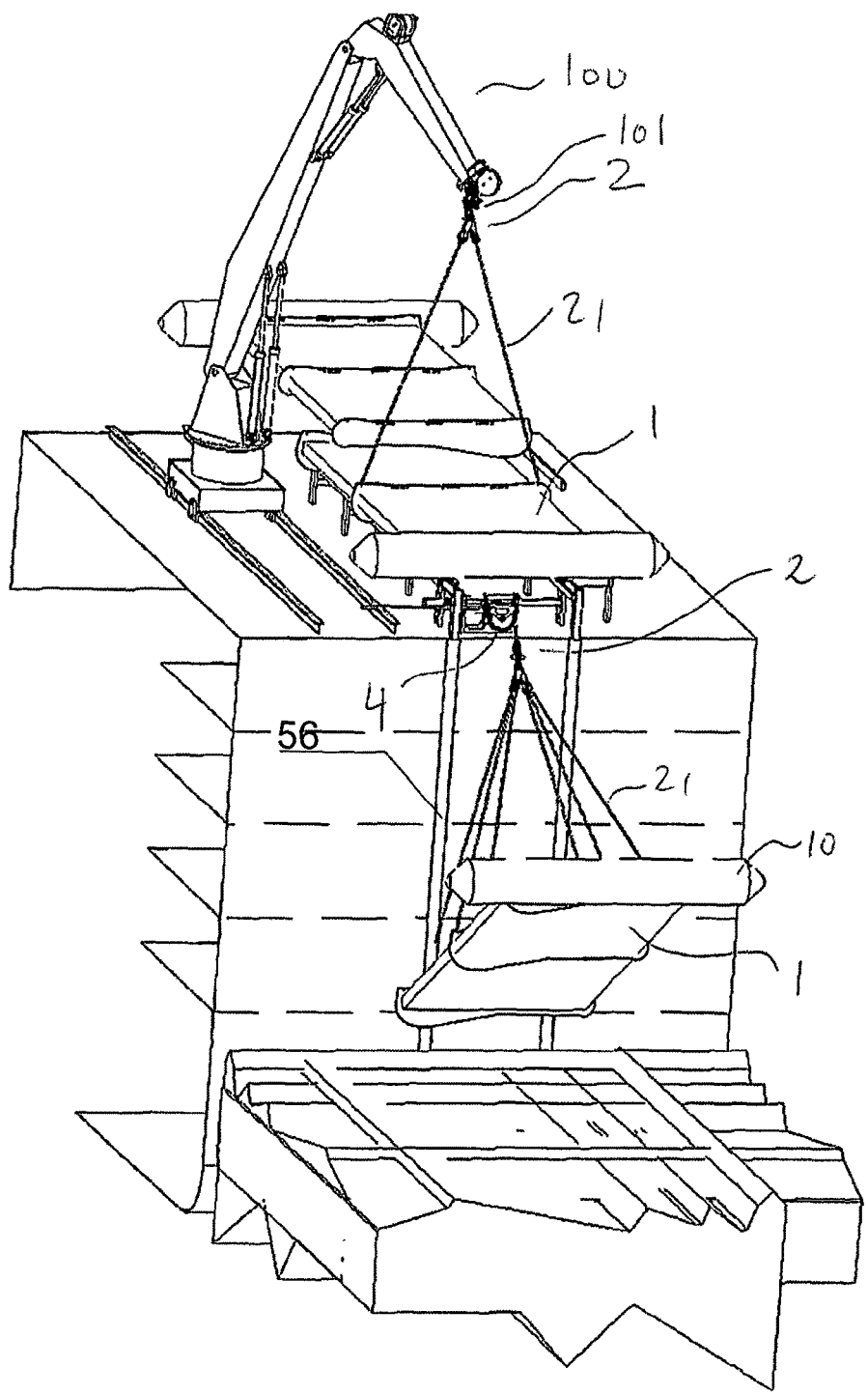

FIG. 9 is an illustration with a cross-section and perspective view of a part of the vessel as seen abaft of the beam towards the starboard side of the vessel. We see the same station for the towing sheave block (41, 4) with the crane (100) with the crane jaw (101). The lower position for the deflector (100) corresponds to the same position shown in FIG. 8. The upper position shows the starboard deflector hanging in the crane (100), (only two of six bridle lines (21) are here shown) and wherein the starboard deflector has been pulled in under an overlying (stored) deflector. In the upper position the deflector (1) is suspended entirely by the crane; in the lower position the deflector is entirely suspended by the towing line (3).

Figure 10:
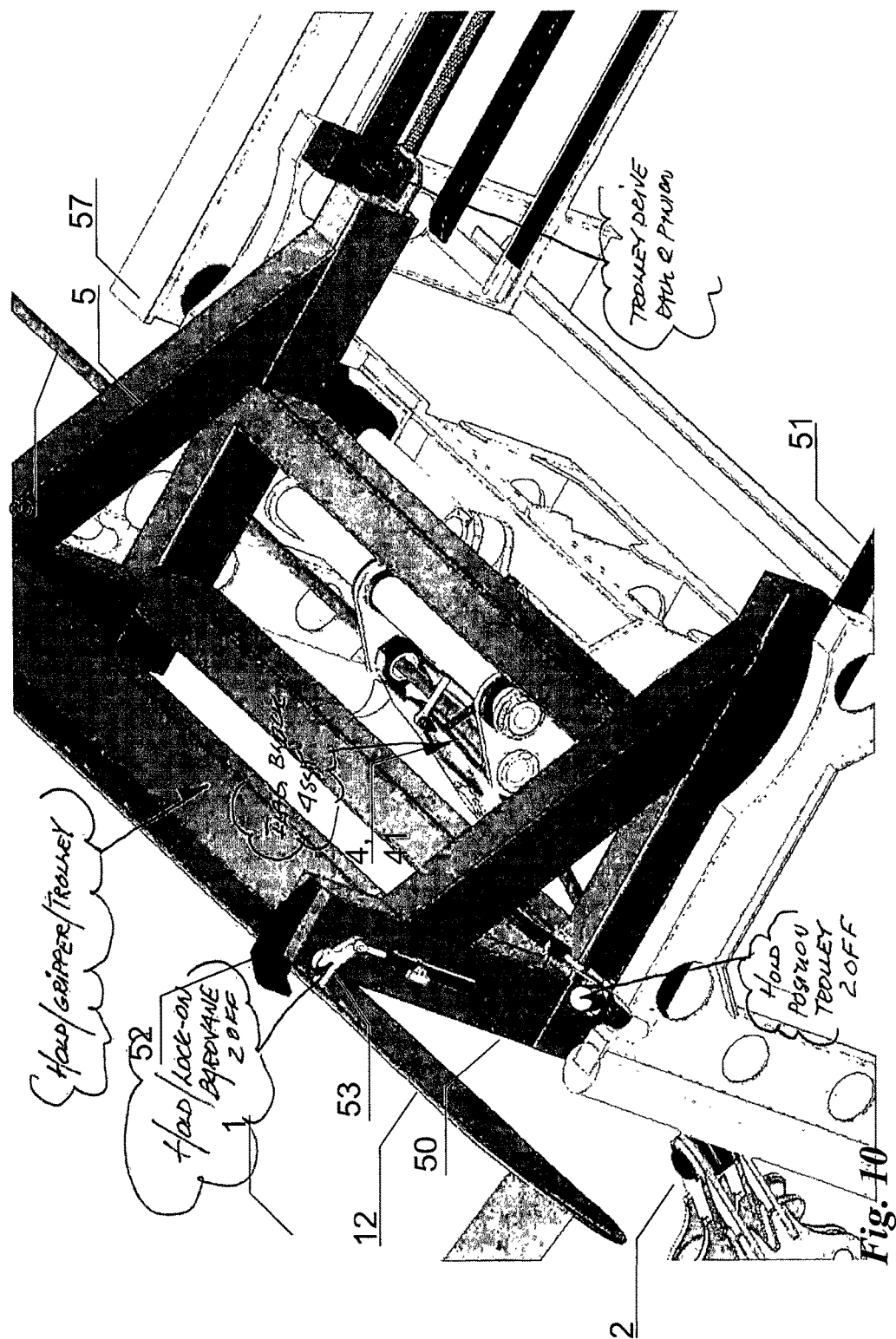
Figure 11:
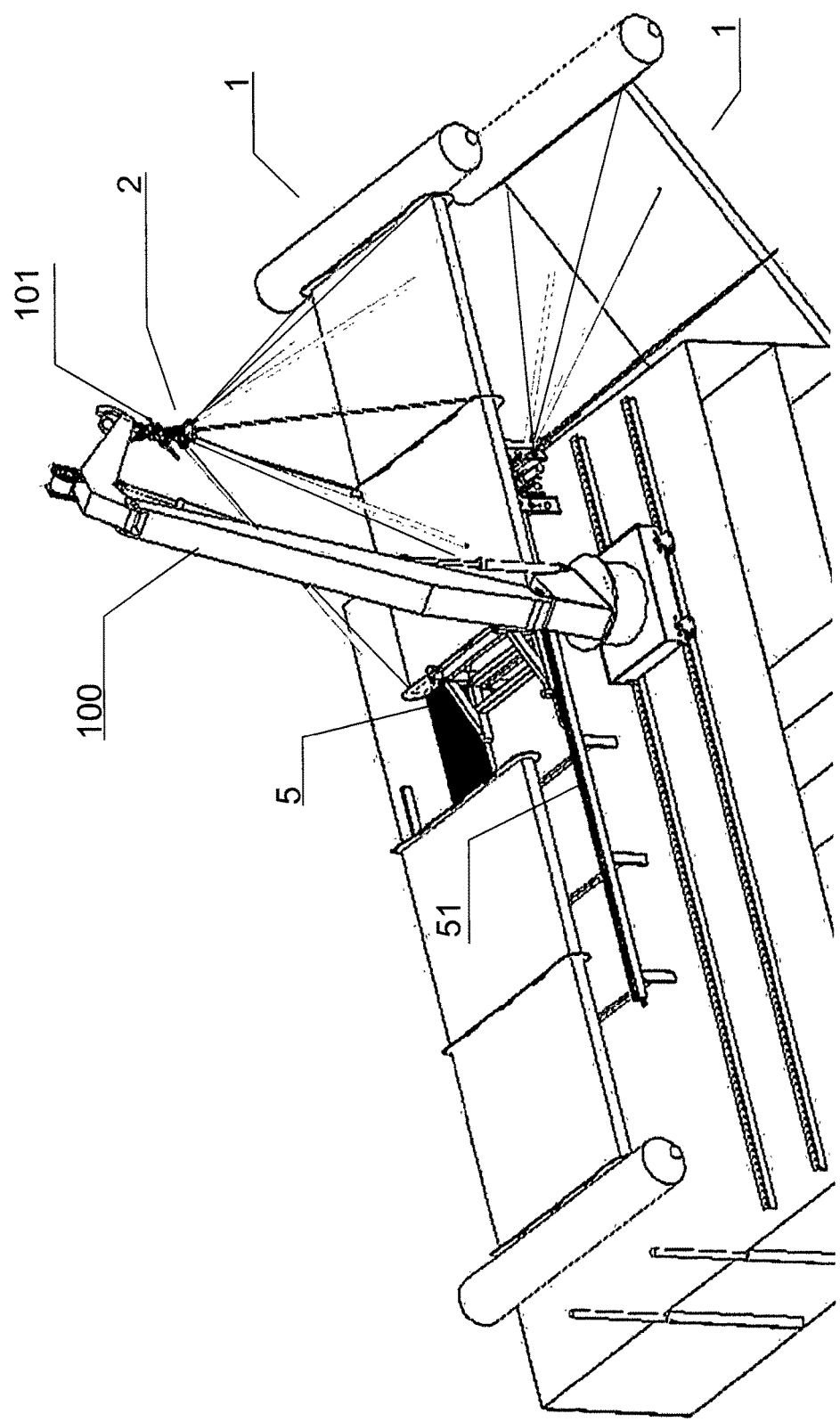

FIG. 10 shows a deflector grabber carriage (5) arranged motorized on rails (51) on the deck. The rails (51) extend out on either sides above the towing sheave block (4, 41) to just over the ship's side, and extend inwardly along the deck at least one carriage's length further than the deflector's height (length on the deck). The deflector grabber carriage is arranged for receiving the vertically upwards sliding deflector's lower horizontal plate (12) while it hangs in the crane (100) and has been elevated entirely to the top of the vertical rails (56) along the ship's side. The deflector grabber carriage is provided with a vertical frame (50) and a lock (501) arranged for locking the carriage (5) in its outer position on the deck so as for the vertical frame (50) to align with the vertical rails (56, please see FIG. 9), on the ship's side. The vertical frame's height is higher than the horizontal plate's (12) width. On top of the vertical frame (50) is arranged downward extending claws (52) arranged for halting the lower horizontal plate (12) of the upwardly sliding deflector, and below those claws are arranged lock handles (53) which hold the horizontal plate edge firmly up against the claws (52). There are arranged actuators for the carriage's lock and lock handles. When the carriage (5) holds the lower horizontal plate (12) in this manner and still hangs in the crane (100) the carriage may be driven inwardly along the deck until the deflector has been pulled entirely to desired position on the deck. FIG. 11 below shows the deflector on its way inwardly (or outwardly) over the deck. Parallel with the carriage's rails (51), but outside these, there are arranged carrier beams for support of the paravane (1) when this is unloaded from the crane (100).

FIG. 11 illustrates the carriage (5) which holds the deflector (1) at its lower horizontal plate (12) and has brought it some distance inwards along the deck while the crane's (100) jaw (101) holds the bridle block (2) according to the invention. The crane is in an embodiment of the invention mounted running on rails transversely on the deck so as the movement becomes liear and that the crane may be used both on starboard and port sides. There is also shown that the deflector may be suspended with the bridle block (2) just below the towing line sheave (4) by the ship's side. FIG. 11 covers both the situations of hauling and launching.

EMBODIMENTS OF THE INVENTION

The invention is in an embodiment shown in FIG. 2 and comprises the following main components: a seismic deflector bridle block (2) comprising two triple head arms (19) each with a triple head (20) in their outer ends for fore and aft sets of bridle lines (21) to a deflector (1). The main purpose for the bridle block is to form a connection for assembling the deflector's six bridle lines and couple those to a towing line. Said triple head arms (19) in their inner ends are coupled together in a hinge bearing block (24). One of the novel features by the invention is that the hinge bearing block (24) further holds an outer end of a catch adapter stem (26) which in its opposite, inner end is provided with a catch adapter axle block (262) with a transverse, preferably through extending and protruding catch adapter axle (263) arranged for being gripped by a crane jaw (101) of a deck crane. Said grip adapter axle block (262) with its grip adapter axle (263) is further connected to a sheave block stem (27) further connected to a sheave block (28) for a towing line sheave (282) for the outer end of a towing line (3). Thus the towing line sheave (282) is no longer arranged in the hinge bearing block. This results in that the crane jaw (101) may lay hold of the less vulnerable grip adapter axle (263) and hold and fold the grip adapter stem (26) and the sheave block stem about the grip adapter axle block (262) for unloading the towing line (3), and oppositely upon launching. Thus the crane jaw (101) is not imminently in danger of destroying force sensors and electrical components of the hinge bearing block (24) which previously was an exposed point on the bridle block according to the prior art.

The deflector heads (or double heads) (20) facing the deflector (1) have bolts (23) which hold eyelets (22) for the bridle lines (21). The oppositely directed hinge bearing block (24) may have an axle or axle sleeve (25), a grip adapter stem (26) with a first grip adapter ring (261) in a first end coupled about the axle sleeve (25), and in its opposite, other end a second grip adapter axle block (262) with the through extending grip adapter axle (263) which in the shown embodiment is arranged orthogonally to the hinge bearing axle (25).

The grip adapter axle is laid hold of by a jaw (101) of the crane (100). The sheave block stem (27) about the grip adapter axle block (262) is in its first end coupled onto the grip adapter axle's (263) middle portion, and with the grip adapter axle (263) protruding in either directions transversely to the grip adapter stem (26) and the sheave block stem (27), and in its opposite, second end provided with a sheave block (28) with a sheave block axle (281) and a sheave (282) for being held by an eyelet (31) on the towing line (3). In the shown embodiment in FIG. 2 the sheave block axle (281) also orthogonal to the grip adapter axle (263), and thus parallel with the hinge bearing axle (25). This provides a horizontal position for the grip adapter axle (263) when the bridle block has been hauled up to near the towing sheave block (4) near the deck, so as for it to be easily accessible for the jaw (101) on the crane, please see FIG. 5 and FIG. 4a.

According to an embodiment of the invention the hinge bearing block (24) has a through extending axle (25) with one or more force sensors (26) connected with a wire to the deflector. Deflectors usually have an accumulator battery, electrical generator and radio communication equipment with the seismic vessel for sensor signals from the force sensors (26) for controlling the deflector.

In an embodiment of the above the grip adapter stem (26) and the sheave block stem (27) are articulated and pivotable via the grip adapter axle block (262) with the grip adapter axle (263). Thus one achieves an advantageous folding property shown in FIG. 4c wherein the towing line and the bridle lines all hang down from the grip adapter axle (263).

The invention may also be expressed in the form of a seismic deflector (1) comprising a float (10) with two or more generally vertically downward protruding wing profiles (11) connected by at least upper and lower horizontal plates (2) connected via fore and aft bridle lines (21) to a bridle block (2) and further to a towing line (3) for being towed from a seismic survey vessel, wherein said bridle block (2) comprises the following features: two triple head arms (19) each with its triple head (20) in their outer ends for fore and aft sets of bridle lines (21) to a deflector (1), wherein said triple head arms (19) in their inner ends are coupled together in a hinge bearing block (24), said hinge bearing block (24) further holding an outer end of a grip adapter stem (26) which in its opposite, inner end is provided with a grip adapter axle block (262) with a transverse, preferably through extending and protruding grip adapter axle (263) for being gripped by a crane jaw (101), and where said grip adapter axle block (262) via the grip adapter axle (263) has a sheave block stem (27) further connected to a sheave block (28) for a tow line sheave (282) for the outer end of a towing line (3). Thus a seismic deflector is provided with a novel bridle line block which is capable of being caught by a crane jaw (101) in the grip adapter axle and fold it in the grip adapter axle block (262) for facilitating handling in to and out from deck of the seismic survey vessel.

The invention may in another aspect be expressed as a marine deflector handling system comprising a seismic survey vessel with a deflector towing sheave (4) with a towing line (3) to a seismic deflector bridle block (2), wherein said bridle block (2) comprises, as counted from its outer end toward its inner end: two triple head arms (19) with each its triple head (20) in their outer ends for fore and aft sets of bridle lines to a deflector (1), wherein said triple head arms (19) in their inner ends are coupled together in a hinge bearing block (24) which further holds an outer end of a grip adapter stem (26). It is further, in its opposite, inner end is provided with a grip adapter axle block (262) with a transverse through extending and protruding grip adapter axle (263) arranged for being gripped by a crane jaw (101). The grip adapter axle (263) extend further and holds an outer end of a sheave block stem (27) with an opposite inner end provided with a sheave block (28) for the towing line (3), see FIGS. 2, 3, 4, 7, and 8.

In an embodiment of the marine deflector handling system of the invention, said deflector towing sheave (4) resides in a deflector towing block (41) which pivots about a horizontal axis (42) which is longitudinally directed mainly parallel with the long axis of said seismic survey vessel and in a bracket (43) directly or indirectly at the ship's side. Said bracket (43) is arranged cushioned and dampened on longitudinally arranged rails (44) in a main frame (45) at the ship's side in order to reduce the risk of damage or breakage to the towing line during towing of the deflector.

In an embodiment of the marine deflector handling system according to the invention, said crane jaw (101) comprises a first and a second double jaw (102, 103) with widths for gripping about the protruding cylindrical portions of said grip adapter axle (263), which may be called a "T"-link, wherein said jaw (102, 103) is articulated about a jaw axle (104) of a jaw bracket (106) and with actuators (105) for opening and closing the double jaws (102, 103) about said grip adapter axle (263), please see FIGS. 4a and 4b, and wherein said jaw bracket is directly or indirectly mounted on a crane (100).

The marine deflector handling system is according to an embodiment of the invention provided with a pivot actuator (110) which pivots said jaw (101) between gripping position and load carrying position, please see FIGS. 4b and 4c. The marine deflector handling system comprises preferably that the jaw bracket (106) is mounted axially and actuator controlled revolving on a revolver bracket (107), directly or indirectly mounted on the crane (100).

The revolver bracket (107) is preferably further mounted on an actuator controlled pivot bracket (108) at the end of said crane (100). In this way the jaw (101) is easily revolvable and controllable to hit and grip the adapter axle (263) in a gentle and safe way.

In an embodiment of the invention the marine deflector handling system is arranged so as for the deflector towing sheave (4) is arranged near a deck level between two vertical slide rails (56) on the hull side, and wherein said crane jaw (101) is steerable to near outside and below said deflector towing sheave (4), please see FIGS. 8. and 9. The crane jaw (101) may be steered in place and catch the transverse grip adapter axle (263) when the towing line (3) has hauled the deflector's (1) bridle block (2) sufficiently near under the deflector towing sheave (4), and then unload the towing line (3) and lift the bridle block (2) with the deflector (1) up to the deck, and place it there, and possibly disconnect the towing line (3).

In a further embodiment the marine deflector handling system according to the invention is provided with a deflector grip carriage (5) arranged motorized on rails (51) which extends out to either sides of and above the towing sheave (41) at the ship's side, provided with a vertical frame (50) arranged for being placed in level with and above the vertical rails (56) on the ship's side, and with downward directed claws (52) arranged for grabbing and holding the lower horizontal plate (12) of a deflector elevated by said crane (100), and arranged for pulling the hanging deflector along the rails (51) in along the deck to a desired storage position. Thus the system is complete to take a seismic deflector entirely from its working position towed abaft of the beam after the towing line, hoist it up along the ship's side, catch the bridle block with a crane jaw, elevate the deflector further to a carriage at the deck, and drive the carriage with the deflector inwardly along the deck while the crane holds the main part of the weight of the deflector.

Thus the invention also comprises, in another aspect, a method of hauling a seismic deflector onto a seismic survey vessel, comprising the steps of:
  hauling said deflector (1) in a towing line (3) until the deflector's (1) bridle block (2) is by the ship's side,
  wherein said bridle block (2) is provided with a transverse and at either sides protruding grip adapter axle (263) between said bridle block's (2) sheave block (28) and hinge bearing block (24),
  wherein a crane (100) with a crane jaw (101) with jaws (102, 103) lay hold of the protruding portions of the grip adapter axle (263) and thereby unloads the towing line (3) and brings the deflector in on board the seismic survey vessel.

In the opposite operation the invention is a method of launching a seismic deflector from a seismic survey vessel, comprising the steps of:
  a crane (100) with a crane jaw (101) with jaws (102, 103) lays hold of the protruding portions of a grip adapter axle (263) which is transverse and protruding on either sides between a bridle block's (2) sheave block (28) and a hinge bearing block (24),
  connecting a towing line (3) to the sheave block (28),
  after which said crane (100) lifts said deflector (1) and brings it outside the ship's side of the seismic survey vessel,
  after which said towing line (3) is tensioned to take over the load of said bridle block (2) with said deflector (1) hanging below,
  after which the jaws (102, 103) are opened and said crane jaw (101) is released and removed from said grip adapter axle (263),
  after which said towing line (3) lowers said deflector (1) to the sea.

It is taken for granted that said seismic array is connected to the deflector. How these are interconnected belongs to the seismic crew's acquired sailor knowledge. The deflector pulls itself laterally out from the seismic survey vessel's course and will eventually span the seismic array to one side, and an oppositely mirroring deflector will span out to the opposite side of the seismic array to the opposite side of the first one.

Advantages of the Invention

An advantage of the invention is that one may use a crane to catch hold of the bridle block after the elevation from the sea of the deflector. This may be conducted without the crew having to hang out over the ship's railing for connecting over from the towing line to the crane. When the crane has caught hold of the block it may lift the deflector straight upward along the ship's side all the way until the lower horizontal plate arrives in level with the top deck, where a grabber mechanism may catch hold of the plate. Then one has a complete hold of the deflector and may guide it further inwards onto the deck.

By means of the invention one distinguishes between a hinge bearing block and a sheave block and creates a distance by means of stems between those where there is arranged a grip adapter axle (263) which is mechanically robust, and the entire assembly may be lifted from the non-vulnerable transverse grip adapter axle (263) without risk of damaging neither the towing line nor the hinge bearing block.

The invention claimed is:

1. A marine deflector handling system comprising:
a seismic survey vessel with a deflector towing sheave with a towing line to a seismic deflector bridle block,
wherein said bridle block comprises, as counted from its outer end to its inner end:
two triple head arms with each its triple head in their outer ends for fore and aft sets of bridle lines to a deflector,
wherein said triple head arms in their inner ends are coupled together in a hinge bearing block which further holds an outer end of a grip adapter stem,
wherein said grip adapter stem in its opposite, inner end is provided with a grip adapter axle block with a transverse through extending and protruding grip adapter axle arranged for being gripped by a crane jaw,
wherein said grip adapter axle further holds an outer end of a sheave block stem with an inner end provided with a sheave block for said towing line, and
wherein said deflector towing sheave resides in a deflector towing block which pivots about a horizontal axis which is longitudinally directed mainly parallel with the long axis of said seismic survey vessel and in a bracket directly or indirectly at the ship's side.

2. The marine deflector handling system according to claim 1, wherein said bracket is arranged cushioned and dampened on longitudinally arranged rails in a main frame at the ship's side.

3. A marine deflector handling system comprising:
a seismic survey vessel with a deflector towing sheave with a towing line to a seismic deflector bridle block,
wherein said bridle block comprises, as counted from its outer end to its inner end:
two triple head arms with each its triple head in their outer ends for fore and aft sets of bridle lines to a deflector,
wherein said triple head arms in their inner ends are coupled together in a hinge bearing block which further holds an outer end of a grip adapter stem,
wherein said grip adapter stem in its opposite, inner end is provided with a grip adapter axle block with a transverse through extending and protruding grip adapter axle arranged for being gripped by a crane jaw,
wherein said grip adapter axle further holds an outer end of a sheave block stem with an inner end provided with a sheave block for said towing line, and
wherein said crane jaw comprises a first and a second double jaw with widths for gripping about the protruding cylindrical portions of said grip adapter axle and articulated about a jaw axle of a jaw bracket and with actuators for opening and closing the double jaws about said grip adapter axle, and wherein said jaw bracket is directly or indirectly mounted on a crane.

4. The marine deflector handling system according to claim 3, with an actuator which pivots said jaw between gripping position and load carrying position.

5. The marine deflector handling system according to claim 3, wherein said jaw bracket is mounted axially or actuator controlled revolving on a revolver bracket, directly or indirectly mounted on said crane.

6. The marine deflector handling system according to claim 5, wherein said revolver bracket is mounted on an actuator controlled pivot bracket at the end of said crane.

7. The marine deflector handling system according to claim 1, wherein said deflector towing sheave is arranged in said deflector towing block between two vertical slide rails on the hull side, and wherein said crane jaw is steerable to near outside and below said deflector towing sheave.

8. A marine deflector handling system comprising:
a seismic survey vessel with a deflector towing sheave with a towing line to a seismic deflector bridle block,
wherein said bridle block comprises, as counted from its outer end to its inner end:
two triple head arms with each its triple head in their outer ends for fore and aft sets of bridle lines to a deflector,
wherein said triple head arms in their inner ends are coupled together in a hinge bearing block which further holds an outer end of a grip adapter stem,
wherein said grip adapter stem in its opposite, inner end is provided with a grip adapter axle block with a transverse through extending and protruding grip adapter axle arranged for being gripped by a crane jaw,
wherein said grip adapter axle further holds an outer end of a sheave block stem with an inner end provided with a sheave block for said towing line, and
wherein the marine deflector handling system further comprises a deflector grip carriage arranged motorized on rails which extends out to either sides of and above the towing sheave at the ship's side, the deflector grip carriage comprising a vertical frame arranged for being placed in level with and above two vertical rails on the ship's side, and downward directed claws arranged for grabbing and holding the lower horizontal plate of a deflector elevated by said crane, and arranged for pulling the hanging deflector along the rails in along the deck to a desired storage position.

9. A method of hauling a seismic deflector onto a seismic survey vessel, comprising the steps of:
providing a marine deflector handling system comprising:
the seismic survey vessel with a deflector towing sheave with a towing line to a seismic deflector bridle block, wherein said bridle block comprises, as counted from its outer end to its inner end;
two triple head arms with each its triple head in their outer ends for fore and aft sets of bridle lines to the seismic deflector, wherein said triple head arms in their inner ends are coupled together in a hinge bearing block which further holds an outer end of a grip adapter stem,
wherein said grip adapter stem in its opposite, inner end is provided with a grip adapter axle block with a transverse through extending and protruding grip adapter axle arranged for being gripped by a crane jaw,
wherein said grip adapter axle further holds an outer end of a sheave block stem with an inner end provided with a sheave block for said towing line, and
wherein said deflector towing sheave resides in a deflector towing block which pivots about a horizontal axis which is longitudinally directed mainly parallel with the long axis of said seismic survey vessel and in a bracket directly or indirectly at the ship's side;
hauling said deflector in the towing line until the bridle block is by a side of the seismic survey vessel; and
a crane with the crane jaw with jaws laying hold of the transverse through extending and protruding grip adapter axle grip adapter axle and thereby unloading the towing line and bringing the deflector in on board the seismic survey vessel.

10. A method of launching a seismic deflector from a seismic survey vessel, comprising the steps of:
  providing a marine deflector handling system comprising:
    the seismic survey vessel with a deflector towing sheave with a towing line to a seismic deflector bridle block, wherein said bridle block comprises, as counted from its outer end to its inner end;
    two triple head arms with each its triple head in their outer ends for fore and aft sets of bridle lines to the seismic deflector, wherein said triple head arms in their inner ends are coupled together in a hinge bearing block which further holds an outer end of a grip adapter stem,
    wherein said grip adapter stem in its opposite, inner end is provided with a grip adapter axle block with a transverse through extending and protruding grip adapter axle arranged for being gripped by a crane jaw,
    wherein said grip adapter axle further holds an outer end of a sheave block stem with an inner end provided with a sheave block for said towing line, and
  wherein said deflector towing sheave resides in a deflector towing block which pivots about a horizontal axis which is longitudinally directed mainly parallel with the long axis of said seismic survey vessel and in a bracket directly or indirectly at the ship's side;
  a crane with the crane jaw with jaws laying hold of the transverse through extending and protruding grip adapter axle grip adapter axle;
  connecting the towing line to the sheave block;
  after the step of connecting, said crane lifting said deflector and bringing the deflector outside the ship's side of the seismic survey vessel;
  after the step of lifting and bringing, said towing line being tensioned to take over the load of said bridle block with said deflector hanging below;
  after the step of the towing line being tensioned, the jaws being opened and said crane jaw being released and removed from said grip adapter axle; and
  after the step of the jaws being opened and the crane jaw being released and removed from the grip adapter axle, said towing line lowering said deflector to the sea.

11. The marine deflector handling system according to claim 1, wherein said crane jaw comprises a first and a second double jaw with widths for gripping about the protruding cylindrical portions of said grip adapter axle and articulated about a jaw axle of a jaw bracket and with actuators for opening and closing the double jaws about said grip adapter axle, and wherein said jaw bracket is directly or indirectly mounted on a crane.

12. The marine deflector handling system according to claim 2, wherein said crane jaw comprises a first and a second double jaw with widths for gripping about the protruding cylindrical portions of said grip adapter axle and articulated about a jaw axle of a jaw bracket and with actuators for opening and closing the double jaws about said grip adapter axle, and wherein said jaw bracket is directly or indirectly mounted on a crane.

13. The marine deflector handling system according to claim 4, wherein said jaw bracket is mounted axially or actuator controlled revolving on a revolver bracket, directly or indirectly mounted on said crane.

14. The marine deflector handling system according to claim 1, wherein said deflector towing sheave is arranged adjacent to a deck level between two vertical slide rails on the hull side, and wherein said crane jaw is steerable to near outside and below said deflector towing sheave.

* * * * *